United States Patent [19]

Wilson, Jr.

[11] Patent Number: 5,047,440

[45] Date of Patent: Sep. 10, 1991

[54] ACTIVATOR CONCENTRATE FOR CHEMICAL BLOWING AGENT COMPOSITIONS

[75] Inventor: Claude F. Wilson, Jr., Cincinnati, Ohio

[73] Assignee: Quantum Chemical Corporation, Cincinnati, Ohio

[21] Appl. No.: 380,979

[22] Filed: Jul. 17, 1989

[51] Int. Cl.$^5$ .............................. C08J 9/06; C08J 9/08
[52] U.S. Cl. ........................................ 521/88; 521/92; 521/93; 521/143; 521/146; 521/149
[58] Field of Search ..................... 521/92, 93, 88, 143, 521/146, 149

[56] References Cited

U.S. PATENT DOCUMENTS

| | | | |
|---|---|---|---|
| 2,941,964 | 6/1964 | Houston et al. | 260/2.5 |
| 3,185,588 | 5/1965 | Resnick | 117/100 |
| 4,383,048 | 5/1983 | Hall et al. | 521/85 |
| 4,394,458 | 7/1983 | Wade | 521/82 |
| 4,397,948 | 8/1983 | Wade | 521/82 |
| 4,399,238 | 8/1983 | Wade | 521/82 |
| 4,403,045 | 9/1983 | Wade | 521/82 |
| 4,413,065 | 11/1983 | Hall et al. | 521/82 |
| 4,431,752 | 2/1984 | Oswitch | 521/85 |
| 4,491,554 | 1/1985 | Hamel et al. | 264/141 |
| 4,520,137 | 5/1985 | Hamel et al. | 521/79 |
| 4,588,754 | 5/1986 | Liu | 521/92 |
| 4,650,816 | 3/1987 | Bertrand | 521/85 |
| 4,769,397 | 9/1988 | Lapierre et al. | 521/85 |
| 4,806,294 | 2/1989 | Lapierre et al. | 264/54 |

OTHER PUBLICATIONS

Gribens and Rei, "Sodium Borohydride—A Novel Blowing Agent For Structural Foams", Plastics Engineering, vol. 38, No. 3, Mar. 1982.

"Hydrocerol—A Chemical Blowing Agent"—Product Literature, author and data unknown.
"Hydrocerol, Hydrocerol-Compound, Hydrocercol-CLM70"—Product Literature—Boehringer Ingelheim, author and date unknown.
Plastics Engineering Handbook—4th Ed.—Ed. by Joel Frades, 1976, p. 847.
"Production of Foamed thermo-plastics with Hydrocerol CF"—Product Literature—Boehringer Ingelheim, author and data unknown.
"Production of Foamed Thermo-Plastics with Hydrocerol-Compound and Hydrocerol Batches"—Product Literature—Boehringer Ingelheim, author and date unknown.
"Process Stream Purification with Sodium Borohydride—Technical Manual and User's Guide"—Morton Thiokol, Inc., Ventron Division, author and data unknown.
"Hydral 700 Series—Product Data Applications"—Alcoa—Aluminum Company of America Chemicals Division, author unknown, Oct. 1970.
"Aluchem, Inc.,—Refined Minerals and Specialty Inorganic Chemicals—Hydrated Alumina"—author unknown, 1988.

Primary Examiner—Morton Foelak
Attorney, Agent, or Firm—Marshall, O'Toole, Gerstein, Murray & Bicknell

[57] ABSTRACT

An activator useful in combination with a primary chemical blowing agent in foaming polymer resins comprises an activator and a metal soap dispersed in a polymeric carrier resin. The metal soap is present in an effective amount to disperse the activator throughout the carrier resin.

28 Claims, No Drawings

ACTIVATOR CONCENTRATE FOR CHEMICAL BLOWING AGENT COMPOSITIONS

BACKGROUND OF THE INVENTION

1. Field of the Invention

This invention relates generally to chemical blowing agent compositions, and more particularly, to activator concentrates useful in combination with a primary chemical blowing agent in foaming polymer resins.

2. Description of Related Technology

Blowing agents are commonly used either alone or in combination to produce a cellular structure in a plastic mass. Generally, blowing agents may be classified either as "physical" or "chemical" blowing agents. Physical blowing agents are generally materials which are normally gaseous at the temperature at which the plastic mass is to be foamed. Chemical blowing agents are generally compositions which decompose or react under the influence of heat to form a gas. Chemical blowing agents range from simple salts such as ammonium or sodium bicarbonate to complex nitrogen-releasing compounds. Chemical blowing agent "concentrates" are compositions or components of compositions which are encapsulated in a carrier resin in a high proportion relative to the carrier resin.

Desirable properties of a chemical blowing agent include:

(a) a narrow gas-release temperature range,
(b) a controllable but rapid gas release rate,
(c) non-corrosive reaction products,
(d) stability in storage, and
(e) reaction products and residue which are compatible with the material to be foamed and have little or no detrimental effect on its properties.

Chemical blowing agents such as described by La-Pierre, et al. in U.S. Pat. Nos. 4,769,397 (Sept. 6, 1988) and 4,806,294 (Feb. 21, 1989) include a primary chemical blowing agent, such as sodium borohydride, and an activation system (referred to herein as an "activator"). The activator generates carbon dioxide and water, the latter of which serves as a proton donor which reacts with sodium borohydride to form hydrogen gas which is used for foaming with the carbon dioxide generated by the activator. The primary chemical blowing agent and the activator are each separately encapsulated in a respective polymeric carrier resin to form concentrates, which are then formed into pellets. A mixture of primary chemical blowing agent concentrate pellets and activator concentrate pellets forms a blowing agent concentrate.

Pellets of the activator concentrate, however, sometimes are highly porous, are friable, produce an excessive amount of fines and dust, do not have a uniform dispersion of the activator encapsulated within the carrier resin, and do not have highly uniform pellet size.

SUMMARY OF THE INVENTION

It is an object of the invention to overcome one or more of the problems described above.

According to the invention, an activator concentrate useful in combination with a primary chemical blowing agent concentrate in foaming polymer resins is provided. The activator concentrate includes a carrier resin, an activator, and an effective amount of a metal soap to disperse the activator in the carrier resin. The concentrate may additionally include an additional lubricating and dispersing agent.

The invention also provides a blowing agent concentrate including a mixture of the activator concentrate and a primary chemical blowing agent concentrate.

Other objects and advantages of the invention will be apparent to those skilled in the art from a review of the following detailed description taken in conjunction with the appended claims.

DETAILED DESCRIPTION OF THE INVENTION

The activator concentrate of the invention includes a polymeric carrier resin, an activator (such as alumina trihydrate or a mixture of citric acid or a salt thereof and sodium bicarbonate, for example) and an effective amount of a metal soap to disperse the activator in the carrier resin. The concentrate preferably is formed into a pellet.

The inventive activator concentrate may include an additional lubricating and dispersing agent. A suitable additional lubricating and dispersing agent is the a fatty acid ester marketed by Washburn-Linder & Co., Inc., (Framingham, Mass., USA) under the trade designation "PEG-6000 DS." The PEG 6000 DS product comprises polyethylene glycol distearate having the chemical structure:

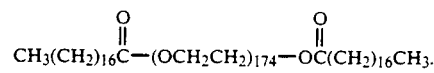

In its commercial form, PEG 6000 DS ester is believed to contain polyethylene glycol, polyethylene glycol monostearate, stearic acid, and water in addition to polyethylene glycol distearate.

In one embodiment of the invention, each of the activator and a primary chemical blowing agent such as an alkali metal borohydride, for example, is encapsulated (dispersed) in a carrier resin to form concentrate pellets. A mixture of the alkali metal borohydride concentrate pellets and the activator concentrate pellets is then prepared. The pellets of the resulting chemical blowing agent concentrate can then be fed to an injection molding machine along with a polymer resin to be foamed. The polymer resin is melted as it is fed into the barrel of the molding machine and is mixed with the blowing agent concentrate pellets. Heating of the mixture results in release of water from the activator.

If the activator comprises a citric acid/sodium bicarbonate mixture, water is released as follows:

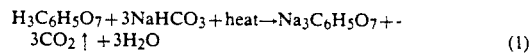

(1)

If the activator is a mixture of sodium bicarbonate and the monosodium salt of citric acid, water is released as follows:

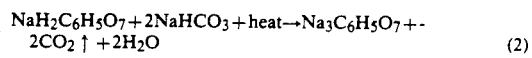

(2)

If the activator is alumina trihydrate, the literature reports that water is released as follows:

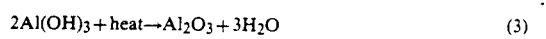

(3)

Sodium borohydride (a preferred primary chemical blowing agent) in turn reacts with the water produced as a result of the reaction of the activator with heat to produce hydrogen gas which, in combination with the carbon dioxide generated in reaction can then foam a plastic mass:

$$NaBH_4 + 2H_2O \rightarrow NaBO_2 + 4H_2 \uparrow \quad (4)$$

In using the chemical blowing agent concentrate of the invention, it is important that the primary chemical blowing agent (e.g., sodium borohydride) not directly contact the activator (e.g. the sodium bicarbonate/citric acid mixture) until foaming is desired. Such isolation of the reactive components is required because water generated by the activator serves as a proton donor which reacts with the sodium borohydride to release hydrogen gas for foaming. Such isolation of the reactive components of the blowing agent concentrate is effected by the use of the concentrate pellets of the invention.

The activator concentrate pellets can be made by blending together the components of the activator concentrate and feeding the resulting blend to a continuous mixer in which the carrier resin is melted to envelop particles of the activator, forcing the melted mixture through a pelletizer extruder to produce an extruded spaghetti-like strand, cooling the strand in a water or cooling trough, and finally cutting the strand into pellets of desired length.

The alkali metal borohydride concentrate pellets may be formed in a similar manner.

Each of the respective carrier resins for the alkali metal borohydride concentrate and the activator concentrate must be molten at foaming conditions in order to be incorporated into the polymer melt.

If the activator is a mixture of sodium bicarbonate and citric acid or salt thereof, the carrier resin for the activator concentrate may be polyethylene. It is also believed that polystyrene is a suitable carrier resin for this activator. If the activator is alumina trihydrate, the carrier resin may be polyethylene, polystyrene or an ethylene-vinyl acetate copolymer. The carrier resin for the sodium borohydride concentrate can be polyethylene, polystyrene, or polypropylene.

It is believed that the metal soap of the activator concentrate acts both as a lubricating and dispersing agent either alone or in combination with an additional lubricating and dispersing agent such as PEG 6000 DS ester. The preferred metal soap of the activator concentrate is zinc stearate, due at least in part to the fact that the melting temperature of zinc stearate is lower than the operating temperature of commercially available continuous mixers needed to melt the carrier resin. It is currently believed that metal soap in liquid form is more effective than a metal soap in solid form unless the solid metal soap is soluble in the polymer melt.

Therefore, it is generally believed that to be useful in the invention, the metal soap must have a suitable melting temperature or be soluble in the polymer melt such that the metal soap is molten or soluble in the polymer resin to be foamed at foaming conditions. The metal soap must also be effective as a dispersant for the activator in the carrier resin. One skilled in the art may readily empirically determine the suitability of a given metal soap by preparing test pellets of the activator dispersed in a carrier resin.

Preferably, the metal soap should also function as a lubricant for the pellet constituents.

The inclusion of a metal soap in the inventive activator concentrate results in several advantages. Firstly, the uniformity of size of the activator concentrate pellets is improved. This is believed to be due, at least in part, to the lubricating ability of the metal soap, which reduces the amount of heat generated in making the pellet, which in turn results in less preblow, which occurs when there is sufficient heat to cause the activation system to prematurely release water and gas before contact with the primary blowing agent. In reactions 1 and 2, above, carbon dioxide and gaseous water vapor are released and in reaction 3 gaseous water vapor is released. Gas released during preblow is believed to deform the pellet, thus increasing its volume. Since blowing agent concentrate pellets are typically metered on a volumetric basis to a polymer to be foamed, the use of pellets of varying size would result in difficulties in accurately measuring the amounts of blowing agent being added. Also, if $CO_2$ or gaseous water is preblown, there is less available activator to react with the alkali metal borohydride, and a lower amount of gas to aid in the foaming process. A uniform pellet size also allows a product to be produced that is within pellet size product specifications, thereby reducing waste.

The use of a metal soap is also believed to produce a concentrate pellet with a more uniform dispersion of the activator throughout the pellet. This results in pellets which do not contain local aggregates of activator on the pellet surface which can be lost either by dissolving in cooling water in the pellet-making process or by abrasion during production or post-blending operations. Uniform dispersion of the activator thus results in less friability and a more uniform gravimetric amount of activator being added to the polymer to be foamed. Since there is less friability, fewer fines and dust are generated. This results in easier equipment clean-up and less physical contact with fines and dust.

According to one embodiment of the invention, an activator concentrate pellet contains about 50 wt. % sodium dihydrogen citrate/sodium bicarbonate mix (manufactured by Boerhringer Ingelheim under the trademark "Hydrocerol-Compound"), about 2 wt. % PEG 6000 DS ester, about 1 wt. % zinc stearate, and about 47 wt. % polyethylene carrier resin (LDPE). When compared to a pellet containing 50 wt. % Hydrocerol-Compound mixture, 4 wt. % PEG 6000 DS ester, and 46 wt. % polyethylene (LDPE), the inventive pellet had improved pellet size uniformity, reduced preblow, reduced fines and better dispersion of the activation system. Improved activator dispersion in the pellet was demonstrated in the pellet formation process where extruded strands foamed less in the water trough used for cooling than did extruded strands not containing zinc stearate.

The metal soap preferably comprises between about 0.25 wt. % and about 3 wt. %, and highly preferably about 1 wt. %, of the activator concentrate pellet to achieve the foregoing advantages. The preferred concentration ranges are not believed to be critical, and suitable concentrations will be readily determinable by those skilled in the art guided by the present disclosure.

Besides improvements in the activator concentrate pellets themselves, improvements are seen in the products foamed by the blowing agent concentrate of the invention. Activator concentrate pellets each comprising about 46 wt. % polyethylene (LDPE), about 50 wt. % Hydrocerol-Compound mixture, and about 4 wt. % PEG 6000 DS ester were combined with sodium borohydride concentrate pellets in a nominal 50:50 wt. proportion mixture to form a chemical blowing agent concentrate. When this blowing agent concentrate was used to foam a modified polyphenylene oxide resin, citrate agglomerates were often found in the foamed product. However, when about 51 wt. % of an inventive activator concentrate comprising about 47 wt. % polyethylene (LDPE), about 2 wt. % PEG 6000 DS ester, about 50 wt. % Hydrocerol-Compound mixture, and about 1 wt. % zinc stearate was combined with about 49 wt. % sodium borohydride concentrate pellets and used to foam the resin, no citrate agglomerates were found in the foamed product. Chemical blowing agent concentrates with up to about 60 wt. % of the inventive activator concentrate pellet have shown similar results.

When the activator is alumina trihydrate and the carrier resin is polyethylene or polystyrene, the alumina trihydrate preferably should be present from about 3 wt. % to about 30 wt. % of the activator concentrate pellet. If the carrier resin is an ethylene-vinyl acetate copolymer, however, the upper concentration limit for alumina trihydrate in the activator concentrate is about 60 wt. %. When the activator is a mixture of sodium bicarbonate and citric acid or salt thereof, the mixture preferably should comprise about 50 wt. % or less of the pellet.

Zinc stearate is available from many sources including Washburn-Linder & Co., Inc. Polyethylene glycol distearate is exemplified by the ester marketed by Washburn-Linder & Co., Inc. under the trade designation "PEG 6000 DS." Alumina trihydrate is available from many sources including AluChem, Inc. (Reading, Ohio, USA) or Alcoa, Chemicals Division. A sodium borohydride concentrate is available from many sources including Morton Thiokol, Inc., Ventron Division (Danvers, Mass.). The sodium bicarbonate/citric acid (or salt) mixture is exemplified by the proprietary compound manufactured by Boerhringer Ingelheim and distributed by Henley & Company, Inc. of New York, N.Y. under the trademark "Hydrocerol-Compound." In the literature, "Hydrocerol-Compound" is referred to as a beeswax-containing, equimolar mixture of acid and carbonate components; however, it is currently believed that this compound is more accurately described as a mixture comprising about 52 wt. % sodium dihydrogen citrate, about 43 wt. % sodium bicarbonate and about 5 wt. % beeswax.

The use of "Hydrocerol-Compound" mixture in a ratio of no more than about 8 parts by weight of active components (i.e., sodium bicarbonate and citric acid) per part by weight of sodium borohydride is preferred, with a ratio of about 5 parts by weight of active components per part by weight of sodium borohydride being highly preferred.

In general, the concentration of sodium borohydride used with a mixture of sodium bicarbonate/citric acid (or salt thereof) mixture and the polymer to be foamed preferably is in the range of about 0.01 wt. % to about 5 wt. %, with a range of about 0.1 wt. % to about 0.3 wt. % being highly preferred. Generally, about 0.2 to about 3 parts by weight of the sodium borohydride concentrate and the sodium bicarbonate/citric acid (or salt thereof) concentrate are present per 100 parts by weight of the polymer resin to be foamed, with a concentration of about 2 parts by weight of the sodium borohydride concentrate and the sodium bicarbonate/citric acid concentrate per 100 parts by weight of the polymer resin being preferred. Lower or higher concentrations may be used but such changes in concentration will have corresponding effects both on the efficiency and the economics of the use of such chemical blowing agent concentrate in the preparation of foam injection molded articles.

It is believed that the invention can be successfully practiced using water-releasing activators other than alumina trihydrate and citric acid (or salt)/sodium bicarbonate mixtures. For example, salt hydrates of the type disclosed in Hamel, et al. U.S. Pat. No. 4,491,554 (Jan. 1, 1985) are believed to be useful. Such salts include borax pentahydrate, $Na_2B_4O_7 \cdot 5H_2O$, $MgSO_3 \cdot 6H_2O$, and $MgSO_4 \cdot 7H_2O$.

Also, high surface area silica having a proton source adsorbed on its surface which is effective in hydrolyzing alkali metal borohydrides are also useful. Such activators are described in Wade U.S. Pat. No. 4,403,045 (Sept. 6, 1983). Various organic acid-containing activators are well known and are believed to be useful in the invention.

When salt hydrate activators (e.g., alumina trihydrate) and alkali metal borohydride blowing agents are utilized, the chemical blowing agent concentrate may be formed as a one part system, if desired, by dry blending a mixture of a polymeric carrier resin, the alkali metal borohydride, the salt hydrate, the metal soap and, if desired, an additional lubricating and dispersing agent to form a mixture. The mixture is thereafter heated to a temperature above the melting point of the resin but less than that which would result in the release of a substantial amount of the water of the salt hydrate to form a molten mixture which is then extruded and cooled to form a solid stable concentrate and formed into pellets. A similar procedure is described in Hamel, et al. U.S. Pat. No. 4,491,554.

The respective disclosures of Wade U.S. Pat. No. 4,403,045, Hamel, et al. U.S. Pat. No. 4,491,554, and LaPierre, et al. U.S. Pat. Nos. 4,769,397 and 4,806,294 are incorporated herein by reference.

The foregoing detailed description is given for clearness of understanding only, and no unnecessary limitations should be understood therefrom, as modifications within the scope of the invention will be apparent to those skilled in the art.

What is claimed is:

1. An activator concentrate useful in combination with a primary chemical blowing agent in foaming molten polymer resin, said concentrate being in the form of pellets and comprising an activator and a metal soap dispersed in a carrier resin, said metal soap being present in an effective amount to disperse said activator in said molten carrier resin, and each of said metal soap and said carrier resin being molten or soluble in said molten polymer resin at foaming conditions, wherein said carrier resin has a melt temperature below the decomposition temperature of said activator.

2. The concentrate of claim 1 further comprising an additional lubricating and dispersing agent.

3. The concentrate of claim 2 wherein said additional lubricating and dispersing agent comprises polyethylene glycol distearate.

4. The concentrate of claim 1 wherein said activator is a mixture of sodium bicarbonate and citric acid or a salt thereof.

5. The concentrate of claim 4 wherein said carrier resin is polyethylene.

6. The concentrate of claim 1 wherein said activator is alumina trihydrate.

7. The concentrate of claim 6 wherein said carrier resin is selected from the group consisting of polyethylene, polystyrene, and ethylene-vinyl acetate copolymers.

8. The concentrate of claim 1 wherein said metal soap is zinc stearate.

9. The concentrate of claim 8 wherein said zinc stearate comprises between about 0.25 wt. % and about 3 wt. % of said concentrate.

10. The concentrate of claim 9 wherein said zinc stearate comprises about 1 wt. % of said concentrate.

11. The concentrate of claim 9 wherein said carrier resin is selected from the group consisting of polyethylene and polystyrene, and said activator is alumina trihydrate and comprises between about 3 and 30 wt. % of said concentrate.

12. The concentrate of claim 9 wherein said carrier resin comprises an ethylene-vinyl acetate copolymer, and said activator is alumina trihydrate and comprises about 60 wt. % or less of said concentrate.

13. The concentrate of claim 9 wherein said activator is a mixture of sodium bicarbonate and citric acid or salt thereof and comprises about 50 wt. % or less of said concentrate.

14. A method of making an activator concentrate useful in combination with a primary chemical blowing agent in foaming molten polymer resin, said method comprising the steps of dispersing an activator and a metal soap in a molten carrier resin that is molten at a temperature below the decomposition temperature of said activator, and cooling and forming the resulting blend into pellets, said metal soap being present in an effective amount to disperse said activator in said molten carrier resin, and each of said metal soap and said carrier resin being molten or soluble in said molten polymer resin at foaming conditions.

15. The method of claim 14 wherein particles of said activator, said metal soap, and said carrier resin are blended together and fed to a mixer in which said carrier resin is melted to envelop said activator particles to form said resulting blend.

16. The method of claim 15 wherein said resulting blend is forced through a pelletizer extruder to form a strand and said strand is cooled and cut into pellets of a desired length.

17. The method of claim 14 wherein an additional lubricating and dispersing agent is dispersed in said molten carrier resin.

18. The method of claim 17 wherein said additional lubricating and dispersing agent comprises polyethylene glycol distearate.

19. The method of claim 14 wherein said activator is a mixture of sodium bicarbonate and citric acid or a salt thereof.

20. The method of claim 19 wherein said carrier resin is polyethylene.

21. The method of claim 14 wherein said activator is alumina trihydrate.

22. The method of claim 21 wherein said carrier resin is selected from the group consisting of polyethylene, polystyrene, and ethylene-vinyl acetate copolymers.

23. The method of claim 14 wherein said metal soap is zinc stearate.

24. The method of claim 23 wherein said zinc stearate comprises between about 0.25 wt. % and about 3 wt. % of said concentrate.

25. The method of claim 24 wherein said zinc stearate comprises about 1 wt. % of said concentrate.

26. The method of claim 24 wherein said carrier resin is selected from the group consisting of polyethylene and polystyrene, and said activator is alumina trihydrate and comprises between about 3 and 30 wt. % of said concentrate.

27. The method of claim 24 wherein said carrier resin comprises an ethylene-vinyl acetate copolymer, and said activator is alumina trihydrate and comprises about 60 wt. % or less of said concentrate.

28. The method of claim 24 wherein said activator is a mixture of sodium bicarbonate and citric acid or salt thereof and comprises about 50 wt. % or less of said concentrate.

* * * * *